United States Patent [19]

Nyssen

[11] 4,161,194

[45] Jul. 17, 1979

[54] REINFORCED SMOOTH FLOW PIPE

[76] Inventor: James Nyssen, 10045 Kenswood Dr., Chilliwack, British Columbia, Canada

[21] Appl. No.: 885,659

[22] Filed: Mar. 13, 1978

[51] Int. Cl.² ............................. F16L 9/16; F16L 9/06
[52] U.S. Cl. .................................... 138/154; 138/173
[58] Field of Search ............... 138/154, 144, 129, 134, 138/135, 150, 122, 121, 173, 172

[56] References Cited

U.S. PATENT DOCUMENTS

| | | | |
|---|---|---|---|
| 2,340,794 | 2/1944 | Chernak | 138/134 |
| 2,763,292 | 9/1956 | Rejeski | 138/135 |
| 3,094,147 | 6/1963 | Nemer | 138/154 |
| 3,572,394 | 3/1971 | Davis | 138/154 |

Primary Examiner—Lenard A. Footland
Attorney, Agent, or Firm—Lee & Smith

[57] ABSTRACT

A reinforced, spirally wound tube or pipe product shaped from an elongated sheet of ductile material formed into adjacent, helical convolutions. The pipe is impressed with at least one longitudinal impression which is trapezoidal in cross-section and formed at the same helix angle as the convolutions so that it is parallel to the juncture of adjacent convolutions. A conforming reinforcement element is located in the impression to strengthen the impression and form a closure of the mouth of the impression. The impression protrudes from the outer wall of the pipe, leaving the inner wall surface of the pipe generally smooth. Adjacent edges of the spiralled sheet are either welded or joined by a continuous lock seam.

7 Claims, 2 Drawing Figures

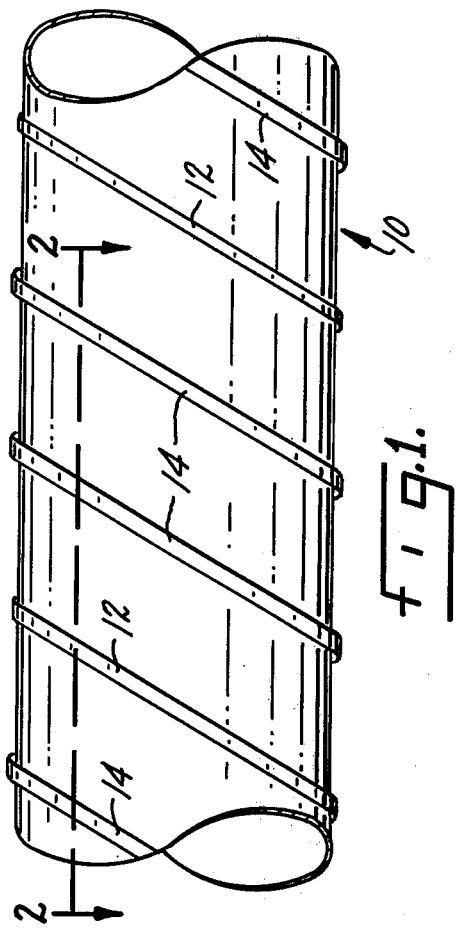
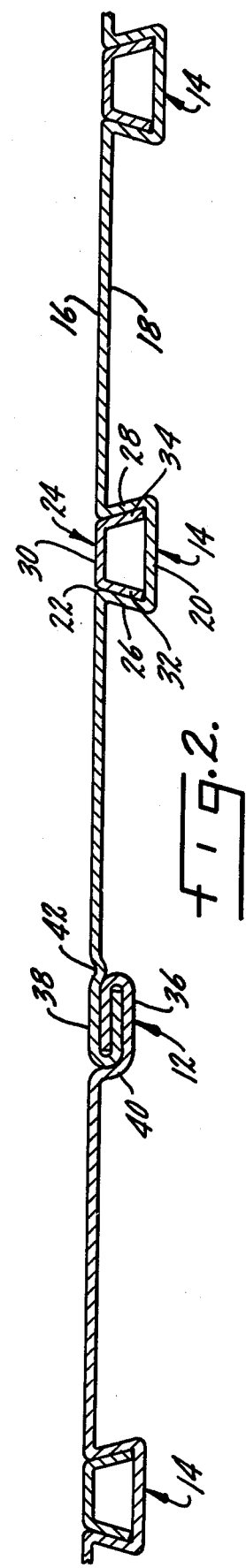

REINFORCED SMOOTH FLOW PIPE

SUMMARY OF THE INVENTION

The Background

This invention relates to spirally wound pipe products, and more particularly to a helical pipe having one or more strengthening ribs or impressions integrally formed in the outer wall of the pipe.

It is well known to form spiral pipe from an elongated sheet of metal or other ductile material. Such pipe products are illustrated, for example, in U.S. Pat. Nos. 1,179,577; 2,337,374; 3,106,177 and 3,132,616.

In the conventional apparatus for producing a helical pipe product, an elongated sheet of metal is impressed with longitudinal corrugations, ribs or the like, and then spiralled into adjacent, helical convolutions which are joined either by welding or by formation of a continuous lock seam. One apparatus for forming a reinforced, spirally wound pipe product of the present invention is disclosed in applicant's co-pending United States patent application entitled "Method and Apparatus For The Manufacture Of Reinforced Smooth Flow Pipe" filed on the same date as the present patent application.

Many pipe products of the prior art, although exhibiting sufficient load bearing capacity to be used as drainage culvert for highways and the like, suffer the disadvantage of having a non-smooth inner wall. For example, helically corrugated pipe produced by the apparatus of Freeze U.S. Pat. No. 2,136,943 has helical corrugations in the inner wall as well. The result of a non-smooth inner wall is inhibition to flow of liquids through the pipe, forcing the pipe user to select a larger diameter pipe than would be needed were the inner wall of the pipe smooth.

The prior art has recognized that the strength of corrugated pipe in combination with a smooth pipe inner wall is a favorable material combination. For example, Lombardi U.S. Pat. No. 3,340,901 has disclosed a pipe product formed from at least two layers of metal including a corrugated pipe outer shell and a smooth pipe inner shell.

However, pipe of this nature is often non-competitive with single-thickness corrugated pipe. The pipe, being formed of two thicknesses of material, often is substantially more expensive than single-thickness corrugated pipe. Furthermore, double thickness pipe such as that of Lombardi is difficult to form, and often the inner surface of the pipe product is dimpled or crimped due to stressive forces inherent in the spiralling operation for formation of the pipe. In addition, formation of a double lock seam as disclosed by Lombardi can be a tedious procedure if the edges of the corrugated and uncorrugated sheets do not exactly align during formation of the lock seam elements and final spiralling of the doubled sheets of material into a pipe.

THE INVENTION

The above disadvantages of the prior art and others are overcome by the present invention which provides a reinforced, spirally wound pipe of a single wall thickness and smooth inner wall having greater strength than the same size and gauge spirally corrugated pipe.

The pipe is formed from an elongated sheet of ductile material, such as galvanized sheet metal, which is curled into adjacent, helical convolutions. The pipe has at least one helical impression shaped therein, the impression forming a rib protruding outwardly from the outer wall of the pipe. The impression is formed as a divergent depression in the inner wall of the pipe, so that it always has a greater inner cross-sectional dimension than the width of the aperture forming the mouth of the helical impression.

To strengthen the formed pipe product, a helical reinforcement element is lodged in each of the impressions. Each element conforms generally to the internal shape of the impression and has a first portion of approximately the same width as the mouth of the impression, the first portion being located parallel to the inner wall of the pipe. A second portion of the reinforcement element extends into the impression.

Adjacent edges of the helical convolutions may be joined by any means, such as welding, or, as preferred, by a double lock seam so formed that it does not protrude into the interior of the pipe. The lock seam may be strengthened by a shallow, helical impression formed in the inner wall of the pipe, constituting a heel against which the metal lock seam bears.

The impressions preferably are trapezoidal in cross-section, with the base of each impression lying generally parallel to, but spaced outwardly from, the outer wall of the pipe, and being of a greater width than the width of the aperture formed by the impression in the pipe wall. The reinforcement element corresponds to the inner dimensions of the impression, with a pair of opposed legs extending from the first portion of the element and lying adjacent and coextensive with the sides of the impression.

Normally, the trapezoidal impression is isosceles in cross-section. The first portion of the reinforcement element lies in the same plane as the wall of the pipe so that the inner wall of the pipe is generally smooth.

The distance between adjacent helical impressions may vary depending on the strength and gauge of the pipe material, and the desired load-bearing capabilities of the formed pipe product. The wall of the pipe between such impressions is normally smooth, so that the inner pipe wall, with reinforcements lodged in the impressions, presents a smooth surface to liquids and reduces turbulent flow characteristics to the least possible minimum.

BRIEF DESCRIPTION OF THE DRAWING

The invention will be described in greater detail with reference to the drawing, in which:

FIG. 1 is a schematic representation of a portion of a pipe product according to the invention, and FIG. 2 is a section taken along lines 2—2 of FIG. 1.

DETAILED DESCRIPTION OF THE INVENTION

Turning now to the drawing, a tube or pipe according to the invention is generally designated 10. The pipe is composed of an elongated sheet of ductile material, such as galvanized steel, which is formed into adjacent, helical convolutions. As illustrated, convolutions are joined by a conventional double lock seam 12, although, if desired, adjacent convolutions can be joined by other means, such as welding.

The pipe 10 has at least one continuous helical impression 14 formed therein in order to strengthen the wall of the pipe. Two such impressions are illustrated in FIG. 1. The impressions 14 are formed from the inner wall 16 of the pipe, protruding through the outer wall 18 at preselected intervals spaced from the double lock seam 12 and from each other. The inner wall 16 of the pipe between impressions 14 remains smooth so that the inner surface of the pipe 10 is smooth. Each impression is formed at the same helix angle as the convolutions so that it is parallel to the juncture (lock seam 12) of adjacent convolutions.

FIG. 2 illustrates each impression with a trapezoidal cross-section, and clearly shows the diverging nature of the impression as it protrudes from the outer wall 18 of the pipe 10. The base 20 of each trapezoidal impression 14 lies generally parallel to, but spaced outwardly from, the outer wall 18. The base 20 is of greater width than the elongated aperture 22 forming the mouth of the impression in order to immobily grip a conforming reinforcement element 24 lodged in the impression.

Each helical trapezoidal impression 14 is preferably isosceles. Opposed sides 26 and 28 converge from the base 20 of each impression to the aperture 22 and sandwich the reinforcement element 24 between them. Although the isosceles cross-sectional configuration is preferred, other trapezoidal configurations, non-isosceles, may be used. Additionally, non-trapezoidal impressions may be employed, so long as the aperture 22 is of lesser width than the inner cross-sectional dimension of the impression, lodging the reinforcement element therein.

Each reinforcement element 24 is utilized to strengthen its corresponding trapezoidal impression 14, and also close the impression so that the inner wall 16 of the pipe 10 is generally smooth. A first portion 30 of the reinforcement element is formed having the same width as the aperture 22 to provide a closure for the mouth of the trapezoidal impression. A pair of legs 32 and 34 divergingly extend from the first portion 30, abutting respective sides 26 and 28 of the trapezoidal impression. The legs 32 and 34 are of sufficient length so that when the element 24 is inserted in each impression 14, the first portion 30 lies generally in the same plane as the wall of the pipe 10 and the legs are bottomed against the base 20.

As illustrated in greater detail in FIG. 2, the double lock seam 12 joining adjacent convolutions of the pipe is formed so that it protrudes from the outer wall 18 of the pipe, leaving the inner wall 16 of the pipe generally smooth. The lock seam is formed from closing a partial lock seam element 36 formed in the edge of one convolution about a corresponding partial lock seam element 38 formed in the adjacent convolution of the pipe in a conventional "stove pipe" or "Pittsburgh" lock seam not further described herein.

In order to assure that the lock seam 12 protrudes from only the outer wall of the pipe 10, the lock seam element 36 is formed with a heel 40. The heel 40 also aids in retaining the lock seam 12 securely together. In addition, during formation of the lock seam element 38, a shallow depression 42 may be formed in the inner wall of the pipe to aid in maintaining the lock seam 12 after the lock seam elements 36 and 38 are engaged as illustrated in FIG. 2.

If a welded seam is used in place of the lock seam 12, to assure that the pipe wall is of sufficient load-bearing strength, an impression 14 normally should be located adjacent the seam. Alternatively, impressions 14 could be spaced on either side of the seam so that the total distance across the lock seam between impressions would be about the same as the normal distance between impressions when a lock seam joint is employed.

The pipe 10 may be formed by many methods. One method, and that preferred in formation of helically wound pipe having trapezoidal impressions, is disclosed in applicant's co-pending application identified above. The pipe is formed from an elongated sheet of material which, prior to spiralling into a helical tube, is impressed with the trapezoidal impressions 14, the reinforcement elements 24 inserted into the impressions, and the lock seam elements 36 and 38 partially formed in opposed edges of the sheet. The sheet is then curled into adjacent, helical convolutions and the lock seam elements 36 and 38 engaged and closed to form the pipe. The pipe may then be severed into discrete lengths by conventional apparatus such as that disclosed in applicant's U.S. Pat. No. 3,815,455.

Various changes may be made to the invention as illustrated and described without departing from the true spirit of the invention or scope of the following claims.

I claim:

1. A reinforced, spirally wound pipe having a generally smooth inner wall, comprising
   a. an elongated sheet of ductile material formed into joined, adjacent helical convolutions,
   b. at least one helical impression forming an integral rib protruding outwardly from the wall of the pipe, said impression having a helical aperture forming a mouth of said impression, said impression further having a divergent depression in the inner wall of the pipe, which has a greater inner cross-sectional dimension than the width of said aperture,
   c. a flat, smooth helical portion of the wall of the pipe located between adjacent ones of said helical impressions, and
   d. a helical reinforcement element lodged in each of said impressions, said element generally conforming to the internal shape of said impression and having a first portion of approximately the same width as said aperture, said first portion being located generally parallel to the inner wall of the pipe, and a second portion extending into the impression.

2. The pipe according to claim 1 in which said impression is generally trapezoidal in cross-section, with the base of said trapezoidal impression lying generally parallel to, but spaced outwardly from, the outer wall of the pipe and being of a greater dimension than the width of said aperture.

3. A pipe according to claim 2 in which the second portion of said reinforcement element comprises a pair of opposed legs extending from said first portion and lying adjacent and coextensive with the sides of said trapezoidal impression.

4. A pipe according to claim 2 in which said trapezoidal impression is isosceles.

5. A pipe according to claim 1 in which the juncture of adjacent helical convolutions is a double lock seam.

6. A pipe according to claim 5 including a shallow helical depression formed in the inner wall adjacent the lock seam to retain the lock seam in a closed position.

7. A pipe according to claim 1 in which said first portion lies in the same plane as the wall of the pipe.